(12) United States Patent
Weinrich

(10) Patent No.: US 6,755,396 B1
(45) Date of Patent: Jun. 29, 2004

(54) PORTABLE VEHICLE HUMIDIFIER

(76) Inventor: Kenneth E. Weinrich, 4911 S. 93rd Ave., Ralston, NE (US) 68127

( * ) Notice: Subject to any disclaimer, the term of this patent is extended or adjusted under 35 U.S.C. 154(b) by 0 days.

(21) Appl. No.: 10/195,805

(22) Filed: Jul. 15, 2002

Related U.S. Application Data
(60) Provisional application No. 60/362,122, filed on Mar. 6, 2002.

(51) Int. Cl.[7] .................................................. B01F 3/04
(52) U.S. Cl. ...................... 261/30; 261/64.1; 261/95; 261/99; 261/DIG. 4
(58) Field of Search ................................ 261/101, 102, 261/104, 30, 62, 64.1, 94, 95, 99, DIG. 4

(56) References Cited

U.S. PATENT DOCUMENTS

| | | | | |
|---|---|---|---|---|
| 474,597 | A | * | 5/1892 | Forbes ........................ 55/417 |
| 475,547 | A | * | 5/1892 | Ely .............................. 55/417 |
| 2,184,833 | A | * | 12/1939 | Dewey ...................... 261/36.1 |
| 3,089,685 | A | * | 5/1963 | Hennemann et al. ...... 261/64.1 |
| 4,346,048 | A | | 8/1982 | Gates |
| 4,389,353 | A | | 6/1983 | Gates |
| 4,390,479 | A | | 6/1983 | Gates |
| 4,500,479 | A | * | 2/1985 | Fukami et al. ................ 261/98 |
| 4,798,060 | A | * | 1/1989 | Long et al. .................... 62/310 |
| 4,882,096 | A | | 11/1989 | Rueben |
| 4,953,831 | A | * | 9/1990 | Albrecht ..................... 261/102 |
| 5,133,044 | A | | 7/1992 | Chiu |
| 5,168,722 | A | * | 12/1992 | Brock ......................... 62/304 |
| 5,230,867 | A | * | 7/1993 | Kunze et al. ............... 422/123 |
| 5,399,299 | A | * | 3/1995 | Stengel et al. ................ 261/30 |
| 5,673,360 | A | | 9/1997 | Scripps |
| 5,904,882 | A | | 5/1999 | Featherly |
| 6,454,247 | B2 | * | 9/2002 | Ujvari ........................ 261/105 |
| 6,575,436 | B2 | * | 6/2003 | Litz ............................. 261/27 |

* cited by examiner

Primary Examiner—Scott Bushey

(57) ABSTRACT

A portable vehicle humidifier includes an enclosed container with a removable cover, the cover having a plurality of apertures formed therein to permit humid air to be released from the container. A fan is mounted over a large opening in the cover to blow air into the container. A liquid-absorptive pad is positioned within the container to prevent excess movement of water in the container, and to slowly release water vapor into air blowing across the pad. A slide plate positioned over the large opening permits adjustment of the air through the container, and the volume and velocity of humid air exhausted from the container.

5 Claims, 2 Drawing Sheets

PORTABLE VEHICLE HUMIDIFIER

CROSS-REFERENCES TO RELATED APPLICATIONS

Priority is claimed based upon Provisional Application Serial No. 60/362,122, entitled "Portable Vehicle Humidifier", filed Mar. 6, 2002.

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to humidifiers, and more particularly to an improved portable humidifier that may be used in vehicles such as over-the-road commercial trucks.

(2) Background Information

Over-the-road vehicles, such as tractor-trailer trucks and recreational vehicles, have long suffered from the problem of maintaining a comfortable humidity in the cab/sleeping compartment of the vehicle. The use of heaters while on the road, or while parked for an extended rest, will remove humidity from the air within the truck. This in turn, causes dry skin and an uncomfortable environment within the cab. In addition, static electricity can build significantly in such an environment.

There are a variety of products that have been used in the residential environment to overcome the problem of low humidity. In general, these devices may be categorized as evaporation-type or steam-type vaporizers or ultrasonic-type atomizers. There are many problems associated with the steam type vaporizers that are well known in the art. For example, the mineral deposits left by the boiled water will cause the hating element to deteriorate, and can be difficult to clean as well. The possibility of scalding or burns is a great safety concern for steam type vaporizers, especially if the vaporizer is intended to be portable.

Ultrasonic atomizers can be relatively expensive, and typically require a 110-Volt power source to operate. Such a source is not readily available in most vehicles, without the use of a transformer or similar electrical equipment. In addition, this type of unit is believed to be slow in hydrating the air, and may not be able to keep up with the demands of a conventional truck cab.

Evaporation type humidifiers typically use pumps or belts to increase the rate of evaporation of the water, and therefore require a 110-Volt power source, like the atomizer. In addition, such humidifiers have additional moving parts that will wear and increase maintenance costs.

An additional problem not addressed by the prior art is the fact that prior art humidifiers are not designed for the movement and vibration found in vehicle cabs, and therefore are prone to spilling water during operation.

BRIEF SUMMARY OF THE INVENTION

It is therefore a general object of the present invention to provide an improved humidifier that is portable and may be used in vehicles without special adapters or other electrical equipment.

Another object is to provide an improved portable vehicle humidifier that does not utilize heater elements or atomizers to create the water vapor, and therefore is loess costly to operate and maintain than steam vaporizers and atomizers.

Yet another object of the present invention is to provide a portable vehicle humidifier that is not prone to spills of the water supply, yet is effective to hydrate the air within a vehicle cab.

These and other objects will be apparent to those skilled in the art.

The portable vehicle humidifier of the present invention includes an enclosed container with a removable cover, the cover having a plurality of apertures formed therein to permit humid air to be released from the container. A fan is mounted over a large opening in the cover to blow air into the container. A liquid-absorptive pad is positioned within the container to prevent excess movement of water in the container, and to slowly release water vapor into air blowing across the pad. A slide plate positioned over the large opening permits adjustment of the air flow through the container, and the volume and velocity of humid air exhausted from the container.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
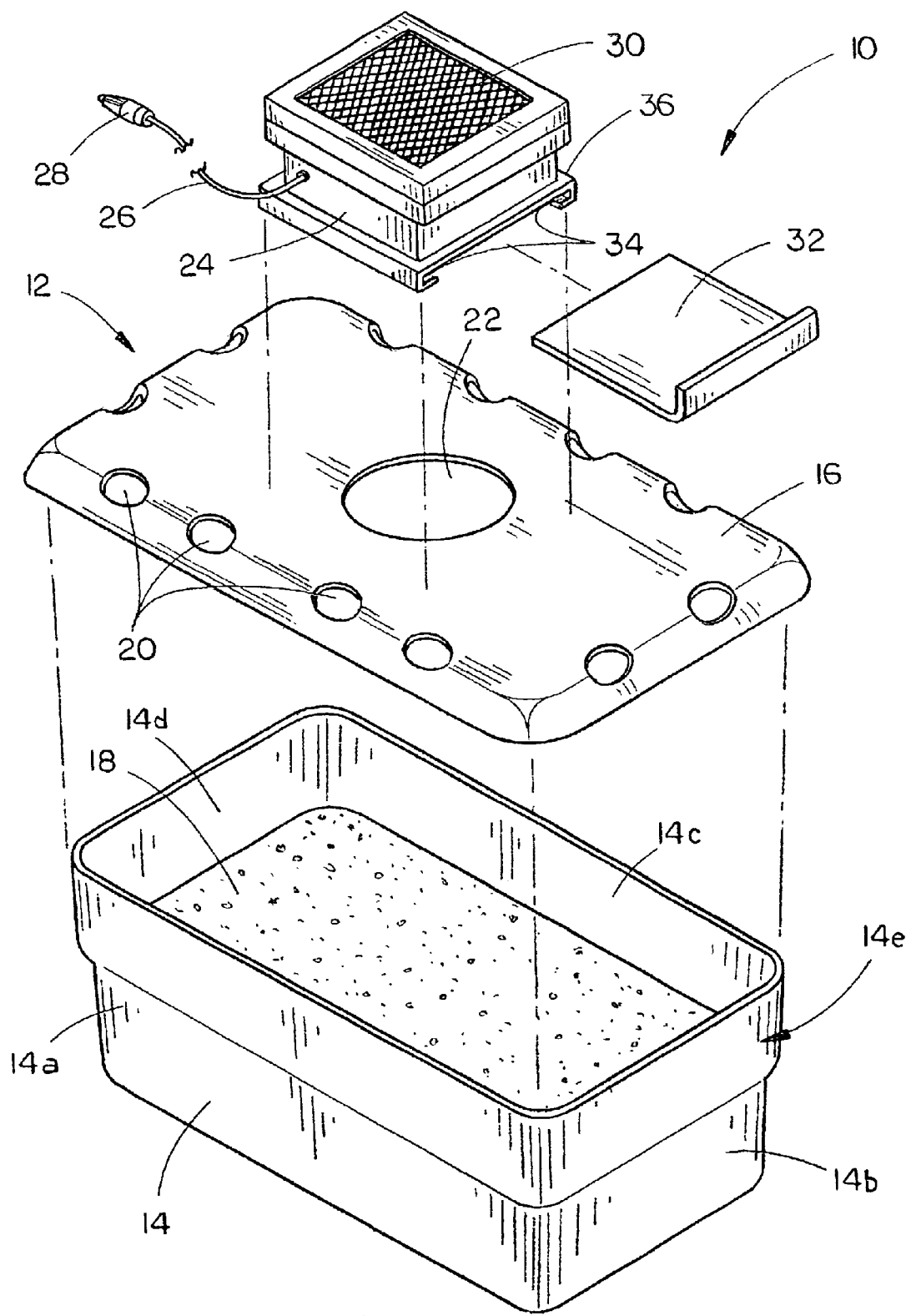
FIG. 1 is an exploded pictorial view of the portable vehicle humidifier of the present invention.

Referring now to the drawings, in which similar or corresponding parts are identified with the same reference numeral, and more particularly to FIG. 1, the portable humidifier of the present invention is designated generally at 10, and includes a closed container 12 having an open-topped box 14 with a removable cover 16. In the preferred embodiment of the invention, the box is approximately 12 inches wide and 16 inches long, with a depth of about 6 inches. Box 14 has generally vertical sidewalls 14a, 14b, 14c, and 14d, with an upper portion designated generally at 14e, which projects outwardly to form a ledge that may be used to assist the user in grasping and lifting the humidifier 10. With the preferred dimensions the box has a capacity of about 2 gallons of water.

Figure 3:
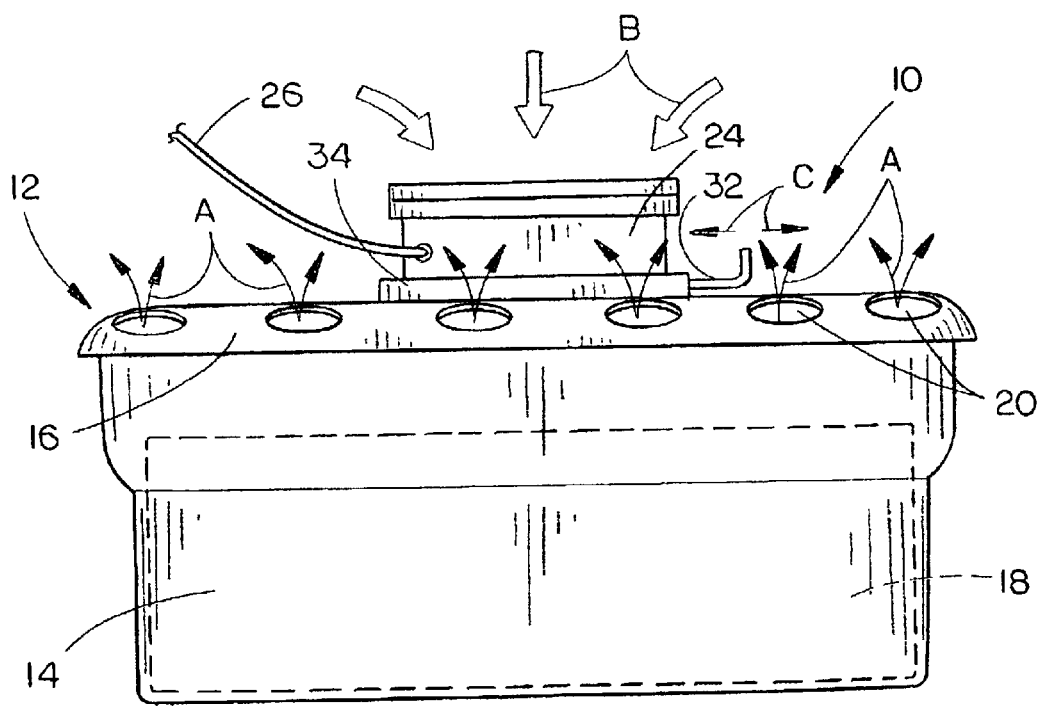
FIG. 3 is a side elevational view of the invention.

As shown in FIGS. 1 and 3, a liquid-absorbent foam pad 18 is positioned within box 14, and preferably fills substantially the entire box 14. While various types of foam may be used for pad 18, it is preferred to use a florist's foam, rather than a sponge-like foam material, because the sponge material has been found to release water at a much faster rate than the florist's foam.

The pad 18 serves two purposes. First, the material restrains the liquid from sloshing about within the container 12, as the vehicle is moving over the road. In addition, pad 18 will gradually release the water as vapor, when air is blown through container 12, thereby causing a more uniform flow of humid air into the truck cab.

Figure 2:
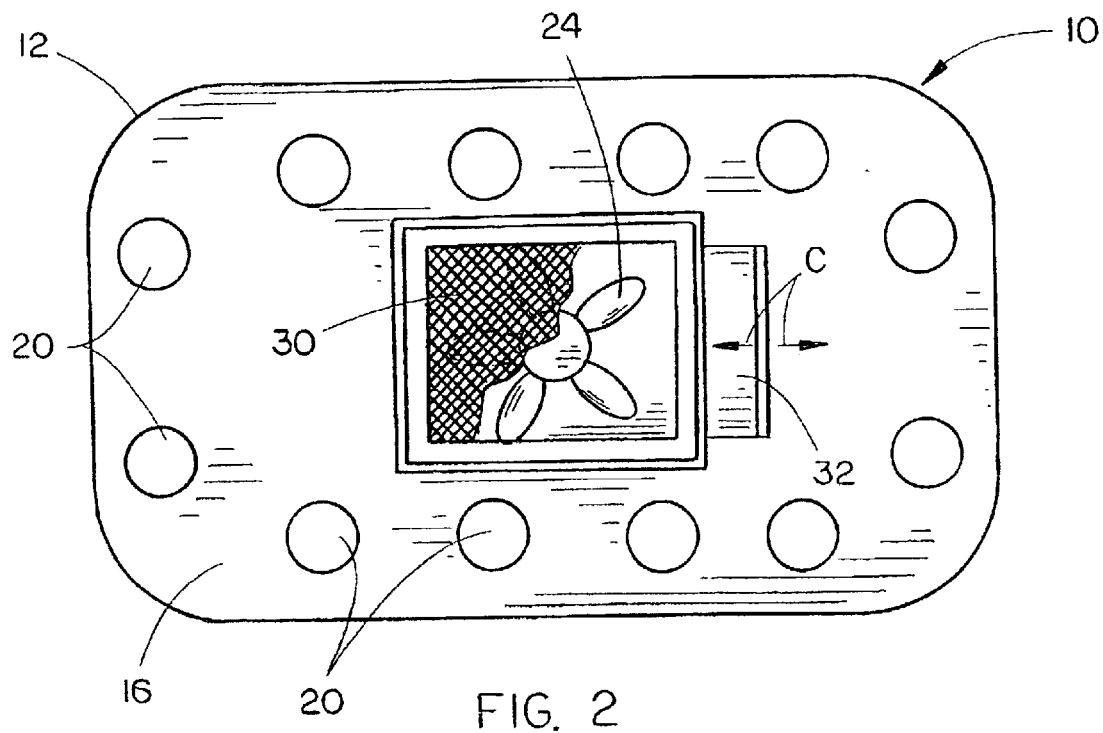
FIG. 2 is a top plan view of the invention.

Referring now to FIGS. 1–3, cover 16 is removably mounted on box 14, to permit easy access to the interior of box 14 and thereby permit installation and removal of foam pad 18, as well as the introduction of water into box 14.

Cover 16 preferably includes an inwardly projecting lip (not shown), or other similar device to selectively secure the cover in position on top of box 14. Cover 16 has a plurality of apertures 20 formed around the perimeter edge. Apertures 20 release humid air from box 14 into the truck cab, as shown by arrows "A" in FIG. 3. The size and number of apertures 20 will vary, depending upon the velocity and volume of air that is desired to be moved through the box 14 and released into the air, as well as the liquid capacity of box 14. However, in the preferred embodiment, about 12 one-inch holes have been found to provide the appropriate amount of airflow from container 12. Apertures 20 are spaced generally uniformly around the perimeter of cover 16, proximal to, but spaced from the perimeter edge to thereby uniformly distribute the vapor throughout the vehicle cab.

Referring once again to FIG. 1, a box fan 24 is mounted to cover 16 over a large central opening 22, so that air may be forced into container 12 and through the saturated pad 18. The inventor has found that a 4 inch box fan having a volume of about 100 cubic feet per minute (CFM) is sufficient for the size of container 12 described hereinabove. A cord 26 is fitted with a 12-volt adapter 28, to permit fan 24 to be plugged into a standard cigarette-lighter receptacle in a vehicle. A filter 30 may be added to the intake side of fan 24, to remove particulate from the air that is blown through container 12.

A slide plate 32 is operably mounted between a pair of opposing guide channels 34 formed within a base 36 on the outlet of fan 24. Slide plate 32 will selectively slide along channels 34 to selectively cover and uncover portions of central opening 22, to thereby control the flow of air into container 12, as shown by arrows "B" in FIG. 3. Movement of slide plate 32 is shown by arrows "C" in FIGS. 2 and 3.

In operation, a pad 18 of the desired size and absorptive characteristics is positioned within box 14. Box 14 is then filled with water to the top of foam pad 18, until pad 18 is saturated. In order to prevent excess water from sloshing about within the container 12, the quantity of water should be limited to that amount that will saturate pad 18. Cover 16 is then snapped on to the top of box 14 to maintain the water and pad 18 within container 12. The humidifier 10 is then placed within a vehicle and plugged in to the lighter socket.

Although not shown in the drawings, a switch may be interposed within cord 26 to permit the selective activation and deactivation of fan 24. Slide plate 32 may be adjusted for the desired air flow from apertures 20, for the desired amount of humidifying air to be released into the vehicle.

Whereas the invention has been shown and described in connection with the preferred embodiments thereof, many modifications, substitutions and additions may be made which are within the intended broad scope of the appended claims.

What is claimed is:

1. A portable vehicle humidifier, comprising:

an enclosed container having a bottom, sides and cover;

said cover having a large opening formed generally centrally therein, and having a depending perimeter side edge in continuous contact with upper edges of the sides to enclose the upper end of the container a plurality of apertures formed in the container cover between the large opening and the Perimeter side edge and spaced uniformly around the cover to permit humid air to be released from the container;

a selectively operable fan mounted over a large opening in the cover, positioned to blow air into the container through the large opening and in to the container, when operated;

said fan being electrically operated, and including a cord with a jack for connection to a 12-volt power source; and a liquid-absorptive pad positioned within the container and extending to fill the entirety of the container from the bottom and sides to the perimeter side edge of the container, for releasably retaining liquid from sloshing about within the container.

2. The humidifier of claim 1, further comprising means in the large opening for selectively and adjustably covering a portion of the opening, to selectively restrict airflow therethrough.

3. The humidifier of claim 2, wherein said means for selectively and adjustably covering a portion of the opening includes a plate slidably mounted in a support base interposed between the fan and the large opening.

4. The humidifier of claim 3, further comprising a filter mounted on an inlet side of the fan, to remove particulate from air prior to entering the container.

5. The humidifier of claim 1, further comprising a filter mounted on an inlet side of the fan, to remove particulate from air prior to entering the container.

* * * * *